(12) United States Patent
Noda et al.

(10) Patent No.: US 10,446,321 B2
(45) Date of Patent: Oct. 15, 2019

(54) MULTILAYER ELECTRONIC COMPONENT

(71) Applicant: TDK CORPORATION, Tokyo (JP)

(72) Inventors: Yohei Noda, Tokyo (JP); Hirobumi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/840,372

(22) Filed: Dec. 13, 2017

(65) Prior Publication Data
US 2018/0166219 A1 Jun. 14, 2018

(30) Foreign Application Priority Data
Dec. 14, 2016 (JP) ................. 2016-242418

(51) Int. Cl.
| H01G 4/30 | (2006.01) |
| H01G 4/12 | (2006.01) |
| C03C 10/00 | (2006.01) |
| C04B 35/468 | (2006.01) |
| H01G 4/224 | (2006.01) |
| C03C 3/085 | (2006.01) |
| C03C 3/087 | (2006.01) |
| C03C 3/089 | (2006.01) |
| C03C 3/091 | (2006.01) |
| C03C 8/24 | (2006.01) |
| C03C 14/00 | (2006.01) |

(Continued)

(52) U.S. Cl.
CPC .............. *H01G 4/30* (2013.01); *C03C 3/085* (2013.01); *C03C 3/087* (2013.01); *C03C 3/089* (2013.01); *C03C 3/091* (2013.01); *C03C 8/24* (2013.01); *C03C 10/00* (2013.01); *C03C 10/0009* (2013.01); *C03C 10/0036* (2013.01); *C03C 14/006* (2013.01); *C04B 35/468* (2013.01); *C04B 35/4682* (2013.01); *H01C 7/18* (2013.01); *H01G 4/129* (2013.01); *H01G 4/224* (2013.01); *C03C 2214/20* (2013.01); *C04B 2235/3206* (2013.01); *C04B 2235/3225* (2013.01); *C04B 2235/3262* (2013.01); *C04B 2235/36* (2013.01); *C04B 2235/6562* (2013.01); *C04B 2235/6565* (2013.01); *C04B 2235/6567* (2013.01); *C04B 2235/6582* (2013.01); *H01G 4/12* (2013.01); *H01G 4/1227* (2013.01); *H01G 4/232* (2013.01)

(58) Field of Classification Search
CPC ............................ H01G 4/30; H01G 4/1227
USPC ........................................ 361/301.4
See application file for complete search history.

(56) References Cited

U.S. PATENT DOCUMENTS 4,347,650 A   9/1982  Mc Larney et al.
6,458,734 B1 * 10/2002 Sugimoto ............. C03C 3/066
                                                 361/321.4

(Continued)

FOREIGN PATENT DOCUMENTS

CN   1308034 A    8/2001
JP   H02-30570 A  1/1990

(Continued)

*Primary Examiner* — Eric W Thomas
(74) *Attorney, Agent, or Firm* — Oliff PLC

(57) ABSTRACT

The present invention relates to a multilayer electronic component which includes an element body where a plurality of internal electrode layers and dielectric layers are alternately laminated. Insulating layers are disposed on a pair of side surfaces of the element body, facing each other. The insulating layers contain a glass composition and a ceramic composition.

14 Claims, 3 Drawing Sheets

(51) Int. Cl.
*H01C 7/18* (2006.01)
*H01G 4/232* (2006.01)

(56) References Cited

U.S. PATENT DOCUMENTS

| | | | | |
|---|---|---|---|---|
| 2001/0016251 A1* | 8/2001 | Sugimoto | ............ | C04B 35/457 428/209 |
| 2010/0025075 A1* | 2/2010 | Feichtinger | ............ | H01C 1/142 174/126.1 |
| 2012/0147516 A1* | 6/2012 | Kim | ............ | H01G 4/232 361/301.4 |
| 2014/0301014 A1* | 10/2014 | Kim | ............ | H01G 4/30 361/301.4 |
| 2014/0301313 A1* | 10/2014 | Jang | ............ | H04L 1/0042 370/329 |
| 2014/0340815 A1* | 11/2014 | Kim | ............ | H01G 4/005 361/301.4 |
| 2014/0345925 A1* | 11/2014 | Lee | ............ | H01G 4/30 174/260 |
| 2014/0362492 A1* | 12/2014 | Lee | ............ | H01G 4/30 361/301.4 |
| 2016/0042865 A1* | 2/2016 | Hong | ............ | H01G 4/12 361/301.4 |
| 2016/0351335 A1* | 12/2016 | Kato | ............ | H01G 4/30 |
| 2017/0323727 A1* | 11/2017 | Mukoyama | ............ | H01G 4/30 |

FOREIGN PATENT DOCUMENTS

| | | |
|---|---|---|
| JP | H03-82006 A | 4/1991 |
| JP | H11-340089 A | 12/1999 |

\* cited by examiner

MULTILAYER ELECTRONIC COMPONENT

BACKGROUND OF THE INVENTION

1. Field of the Invention

The present invention relates to a multilayer electronic component.

2. Description of the Related Art

In recent years, as the electronic circuits used in digital electronic devices such as mobile phones tend to become high density, higher demand is made on the miniaturization of electronic components, and the multilayer electronic components used to form the circuit develop rapidly toward miniaturization and high capacity.

For example, in multilayer electronic components such as a multilayer ceramic capacitor, a plurality of internal electrodes are disposed inside a ceramic sintered body.

In patent document 1, a multilayer ceramic capacitor with a no-side-gap structure is proposed to improve the utilizing efficiency of the electrode materials or to raise the electrostatic capacitance or the accuracy, etc.

However, there is a problem that the withstand voltage is low because the internal electrodes are exposed from a side surface of the ceramic sintered body.

In patent document 2, a structure able to increase withstand voltage is proposed. That is, after a ceramic sintered body in which the internal electrode is exposed from a pair of side surfaces is obtained, the section near the side edge of the internal electrode is removed. Next, insulating materials are injected into the removed section to form an insulating layer, thus increasing the withstand voltage.

In patent document 3, a method for manufacturing a ceramic sintered body is proposed, in which glass is precipitated on the external surface of the ceramic sintered body because the ceramic composition of the ceramic sintered body contains glass composition of a specific weight ratio, by which a ceramic sintered body covered by an insulating layer with glass as the main composition is obtained.

However, when glass is used in the insulating layer, there is risk that cracks emerge in the glass due to external shock and the cracks may extend to the ceramic green body because of property of the glass. If the cracks reach the ceramic sintered body, it will be easy for infiltration of the plating liquid or decrease of the moisture resistance to occur during the plating step.

[Patent document 1] Japanese examined patent application No. 2-30570
[Patent document 2] Japanese laid-open patent application No. 3-82006
[Patent document 3] Japanese laid-open patent application No. 11-340089

SUMMARY OF THE INVENTION

In view of the above situation, the present invention aims to provide a multilayer electronic component with excellent moisture resistance.

Means for Solving the Problem

In order to achieve the above purpose, the multilayer electronic component of the present invention is as follows.

[1] A multilayer electronic component including an element body where a plurality of internal electrode layers and dielectric layers are alternately laminated, in which insulating layers are disposed on at least one side surface of the element body, and the insulating layers contain a glass composition and a ceramic composition.

According to the present invention, a multilayer electronic component with excellent moisture resistance is provided.

The following embodiments are illustrated as specific embodiments of the above-mentioned [1].

[2] The multilayer electronic component according to [1], in which when the whole insulating layer is 100 wt %, a content of the ceramic composition is 10-70 wt %.

[3] The multilayer electronic component according to [1] or [2], in which the ceramic composition includes an oxide containing at least one element from a group of Al, Zr, Ti, Ce, Fe, Mn, Cu, Co and Zn.

[4] The multilayer electronic component according to any one of [1]-[3], in which when the whole glass composition is 100 wt %, the glass composition includes 35-75 wt % of $SiO_2$.

[5] The multilayer electronic component according to any one of [1]-[4], in which when the whole glass composition is 100 wt %, the glass composition includes 10-35 wt % of alkali metals.

[6] The multilayer electronic component according to any one of [1]-[5], in which when the whole glass composition is 100 wt %, the glass composition includes 10-50 wt % of BaO.

[7] The multilayer electronic component according to any one of [1]-[6], in which when the whole glass composition is 100 wt %, the glass composition includes 1-10 wt % of $Al_2O_3$.

DESCRIPTION OF THE PREFERRED EMBODIMENTS

Figure 1:
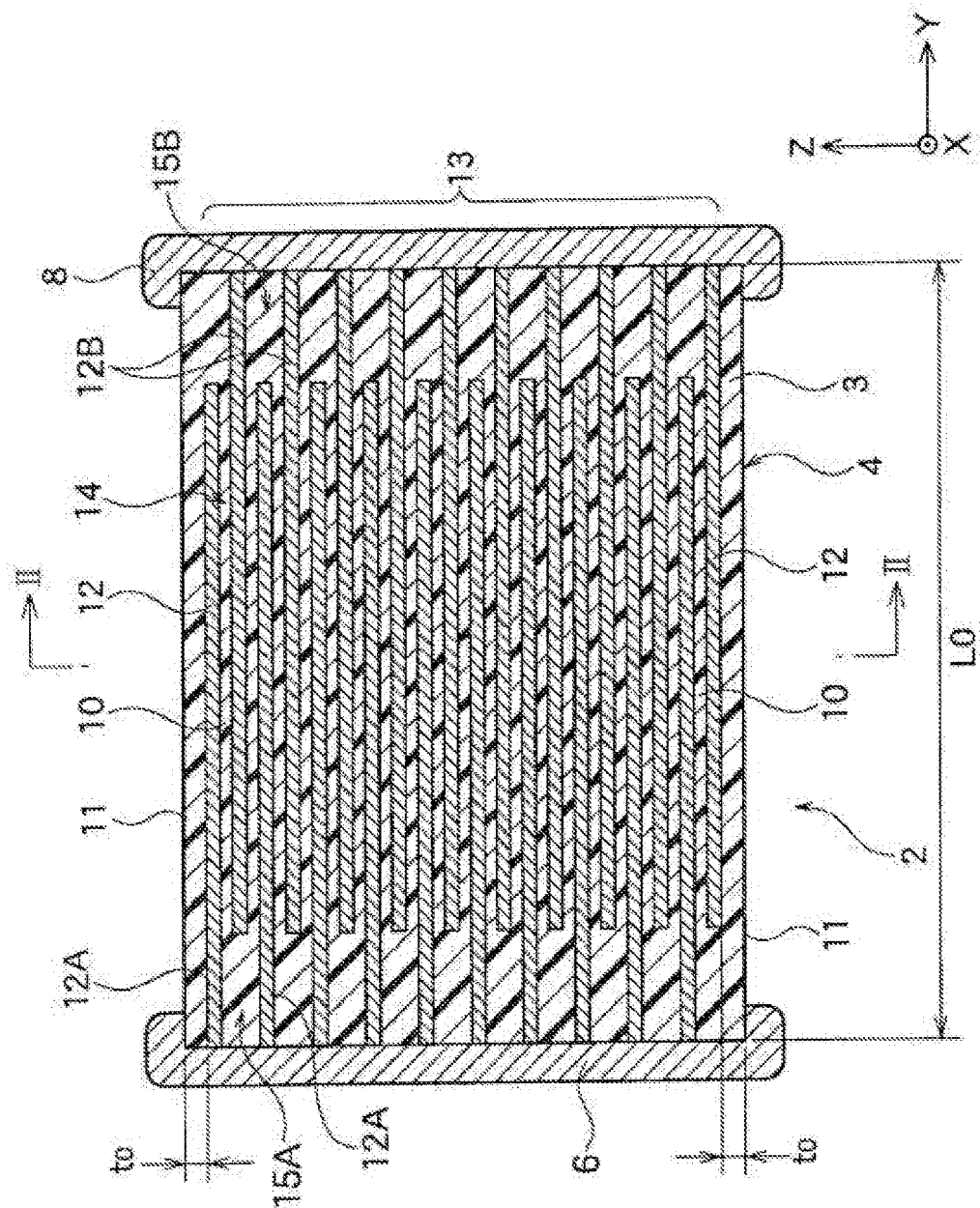
FIG. 1 is a schematic cross sectional view of a multilayer ceramic capacitor according to an embodiment of the present invention.

The present invention will now be described in detail based on the present embodiment referring to the drawings, but the present invention is not limited to the following embodiments.

In addition, the structural elements described below include those which can be easily assumed by one of ordinary skill in the art and those substantially the same. Furthermore, the structural elements described below can be properly combined.

The present invention is described below based on the embodiments shown in the figures.

The Overall Structure of a Multilayer Ceramic Capacitor

The overall structure of a multilayer ceramic capacitor is described as one embodiment of a multilayer electronic component of the present embodiment.

Figure 2:
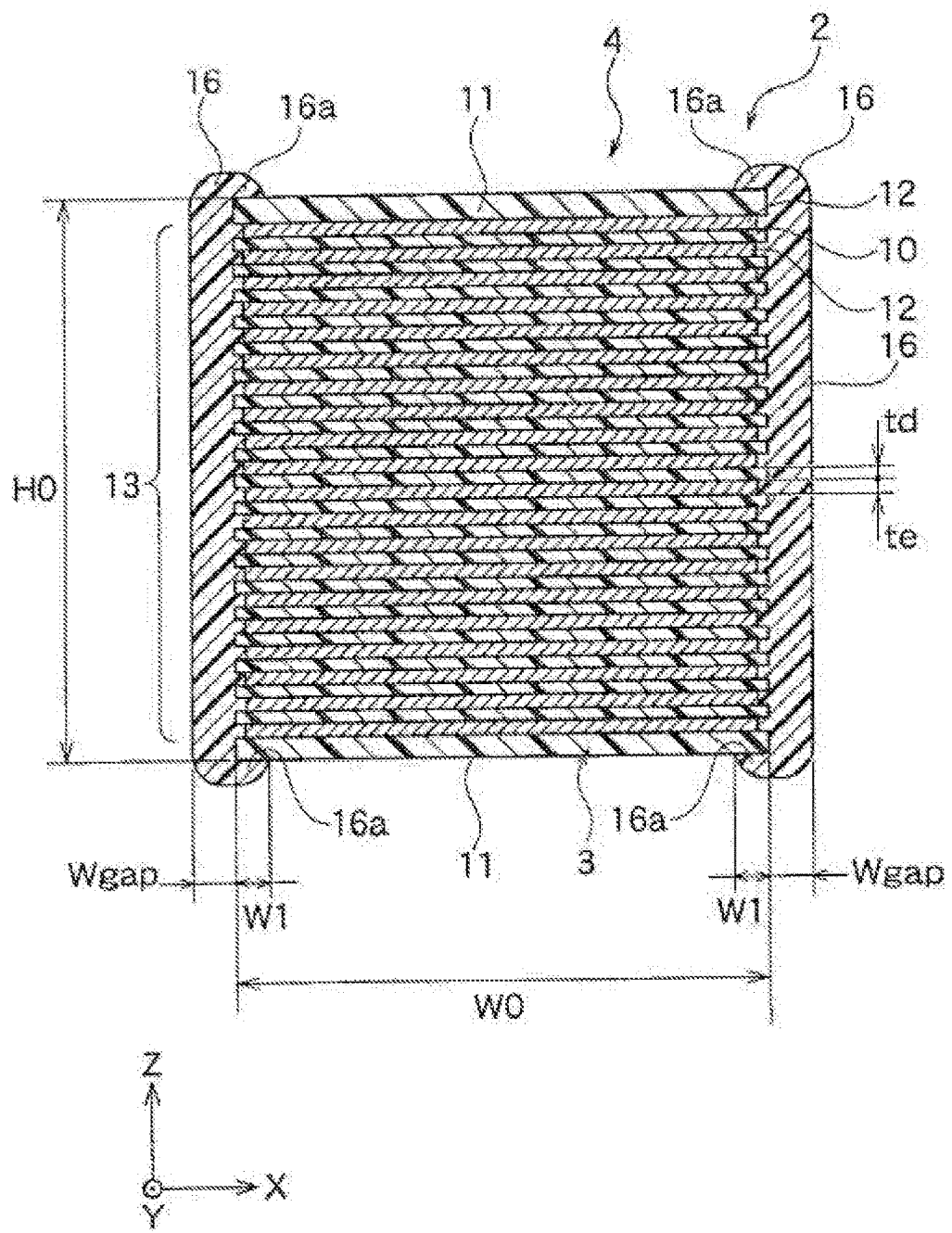
FIG. 2 is a cross sectional view along the II-II line in FIG. 1.

As shown in FIG. 1, the multilayer ceramic capacitor 2 of the present embodiment includes a ceramic sintered body 4, a first external electrode 6, and a second external electrode 8. In addition, as shown in FIG. 2, the ceramic sintered body 4 includes an element body 3 and insulating layers 16.

The element body 3 includes inside dielectric layers 10 and internal electrode layers 12, which are substantially parallel to a plane including the X axis and the Y axis. The internal electrode layers 12 are alternately laminated between the inside dielectric layers 10 along the direction of the Z axis. Here, "substantially parallel" means that most parts are parallel, but parts that are slightly un-parallel may also exist, that is, the internal electrode layers 12 and the inside dielectric layers 10 may have a little concavity and convexity or may tilt slightly.

The parts where the inside dielectric layers 10 and the internal electrode layers 12 are alternately laminated are interior regions 13.

In addition, the element body 3 has exterior regions 11 on both end surfaces in the lamination direction Z (the Z axis). The exterior regions 11 are formed by laminating a plurality of outside dielectric layers which are thicker than the inside dielectric layers 10 forming the interior regions 13.

Moreover, "the inside dielectric layers 10" and "the outside dielectric layers" are referred to as "the dielectric layers" in some cases below.

The material of the dielectric layers forming the inside dielectric layers 10 and the exterior regions 11 may be the same or different, and are not specially limited. For example, they can be formed by taking dielectric material with a perovskite structure represented by a chemical formula such as $ABO_3$ as the main composition.

In the $ABO_3$, A is not specially limited, however, it exemplifies at least one element chosen from a group of Ca, Ba and Sr. B is not specially limited, however, it exemplifies at least one element chosen from a group of Ti and Zr. The molar ratio of A/B, is not specially limited, however, it is 0.980-1.020 for example. In addition, rare earth oxides, alkali earth metal oxides, magnesium oxide and transition metal oxides, etc. may be exemplified as the subcomposition in the dielectric material. Also, mixtures containing the above oxides are exemplified. Complex oxides containing any one of the above element are exemplified. Furthermore, sintering aids containing $SiO_2$ are exemplified as glass. The rare earth element is at least one chosen from Sc, Y, La, Ce, Pr, Nd, Pm, Sm, Eu, Gd, Tb, Dy, Ho, Er, Tm, Yb and Lu. The transition metals may be V, W, Mn and Mo or other transition metals.

One end of the alternately laminated internal electrode layers 12 has a lead-out section 12A electrically connected to the inner side of the first external electrode 6 which is formed on the external side of a first end of the ceramic sintered body 4 in the Y axis direction. And the other end of the alternately laminated internal electrode layers 12 has a lead-out section 12B electrically connected to the inner side of the second external electrode 8 which is formed on the external side of a second end of the ceramic sintered body 4 in the Y axis direction.

The interior regions 13 have a capacity region 14 and lead-out regions 15A, 15B. The capacity region 14 is a region where the internal electrode layers 12 are laminated with the inside dielectric layers 10 in-between along the lamination direction. The lead-out region 15A is a region located between the lead-out sections 12A of the internal electrode layers 12 connected to the external electrode 6. The lead-out region 15B is a region located between the lead-out sections 12B of the internal electrode layers 12 connected to the external electrode 8.

The conductive material contained in the internal electrode layers 12 are not specially limited and can be metals such as Ni, Cu, Ag, Pd, Al, Pt, or their alloys. It is especially preferred to utilize Ni or Ni alloys. When Ni alloys are utilized, alloys of more than one element chosen from Mn, Cr, Co and Al with Ni are preferred, and a Ni content of 95 wt % or higher in the alloys is preferred. Additionally, Ni or the Ni alloys may contain various trace compositions such as P with a content approximately 0.1 wt % or less.

As shown in FIG. 2, on the two end surfaces of the ceramic sintered body 4 in the X axis direction, i.e. the side surfaces where the ends of the internal electrodes 12 expose, the insulating layers 16 which cover the ends of the internal electrode layers 12 of the element body 3 are disposed. The side surface where the insulating layers 16 are disposed may be only one of the end surfaces in the X axis direction. Besides, the insulating layers 16 may also be formed on the upper section and/or lower section of the ceramic sintered body 4 in the Z axis direction (the lamination direction).

The insulating layers 16 contain the glass composition and the ceramic composition.

Since the insulating layers 16 contain both the glass composition and the ceramic composition, the moisture resistance can be prevented from decreasing. The inventors think the reason for moisture resistance improvement is that since the insulating layers 16 contain the ceramic composition, the cracks can be prevented from reaching the element body 3 even if cracks emerge inside the insulating layers 16. Moreover, the ceramic composition is contained in the form of, for example, a ceramic filler.

Although there is no special limit on the content of the ceramic composition in the insulating layers 16, it is preferably 10-70 wt % when the whole insulating layer is 100 wt %. If the content is 10 wt % or more, the effect of preventing crack extension will rise. If the content is 70 wt % or less, the sintering property of the insulating layers 16, especially the sintering property of gap section mentioned later can be improved, and the moisture resistance be further improved. Besides, when the content is 10-70 wt %, the compressive stress becomes high, so the strain stress and the strain strength can also be increased. The content of the ceramic composition is more preferably 30-60 wt %, and the most preferably 40-56 wt %.

Although there is no special limit on the ceramic composition of the insulating layers 16, it is preferable to include oxides containing at least one element chosen from Al, Zr, Ti, Ce, Fe, Mn, Cu, Co and Zn. The oxides containing at least one element chosen from Al, Zr, Ti, Ce, Fe, Mn, Cu, Co and Zn include complex oxides containing at least one element from these elements. It is more preferable to include the oxides containing at least one element chosen from Cu, Co, Ce, Mn, Al, Zr and Ti, and further preferable to include the oxides containing at least one element chosen from Cu and Co. In the cases including the oxides containing at least one element chosen from Cu and Co, comparing with cases using oxides of other elements only, cracks reaching the green body can be further prevented.

By including the oxides containing at least one element chosen from Al, Zr, Ti, Ce, Fe, Mn, Cu, Co and Zn, the emergence of crack coming from the inside of a gap section of the insulating layers 16 can be inhibited. The reason for the crack inhibition is not clear, and the inventors think the reason is that the reaction between the oxide containing at least one element chosen from Al, Zr, Ti, Ce, Fe, Mn, Cu, Co and Zn with glass is relatively slow. Furthermore, by containing the oxide with at least one element chosen from Al, Zr, Ti, Ce, Fe, Mn, Cu, Co and Zn, the strain stress and the strain strength can also be improved.

In addition, there is no upper limit on the content of Ba in the ceramic composition of the insulating layers 16, and when the whole ceramic composition is 100 wt %, the content converted to the content of BaO is preferably 50 wt % or less. Similarly, the content of Ca, converted to the content of CaO, is preferably 50 wt % or less, and the content of Sr, converted to the content of SrO, is preferably 50 wt % or less. And when the content of Ba, the content of Ca and the content of Sr are converted to the content of BaO, CaO and SrO respectively, it is preferable that the total content of Ba, Ca and Sr is 50 wt % or less.

Although there is no special limit on the glass composition of the insulating layers 16, a content of 35-75 wt % of $SiO_2$ is preferred when the overall glass composition is 100 wt %.

By containing 35 wt % or more of $SiO_2$ in the glass composition of the insulating layers 16, the plating tolerance is increased. Besides, by containing 75 wt % or less of $SiO_2$, the emergence of cracks inside the insulating layers 16 is easily inhibited. Although it is not clear about the reason why the emergence of cracks is easily inhibited by containing 75 wt % or less of $SiO_2$, and the inventors considers that the brittleness of the insulating layers 16 tends to be high when the content of $SiO_2$ exceeds 75%.

When the overall glass composition is 100 wt %, it is preferable for the insulating layers 16 to contain 10-35 wt % of the alkali metal.

By containing 10 wt % or more of alkali metal in the glass composition of the insulating layers 16, the strain strength on the chip increases. Although the reason for the increase of the strain strength on the chip is not clear, the inventors considers that that it is because it becomes easy to apply compressive stress to the insulating layers 16 when the softening point of the glass composition decreases and it becomes easy to properly react with the ceramic composition. Besides, by containing 35 wt % or less of alkali metal, the electrical resistivity of the glass composition increases, and the withstand voltage can be increased.

When the overall glass composition of the insulating layers 16 is 100 wt %, the content of BaO is preferably 10-50 wt %.

By containing 10 wt % or more of BaO in the glass composition of the insulating layers 16, the plating tolerance tends to increase. Besides, by containing 50 wt % or less of BaO, the plating tolerance tends to increase.

When the overall glass composition of the insulating layers 16 is 100 wt %, the content of $Al_2O_3$ is preferably 1-10 wt %.

By making the content of $Al_2O_3$ in the glass composition of the insulating layers 16 range from 1 wt % or more to 10 wt % or less, the plating tolerance increases.

Other compounds may be contained as the glass composition of the insulating layers 16. For example, CaO, SrO, $B_2O_3$ can be exemplified. There is no special limit on the content amount of other compounds.

There is no special limit on the material of the external electrodes 6, 8, and at least one element from Ni, Pd, Ag, Au, Cu, Pt, Rh, Ru, Ir, or the alloy of these elements can be used. Usually, Cu, Cu alloy, Ni, Ni alloy, Ag, Ag—Pd alloy, In—Ga alloy, and etc. are used.

Moreover, in FIG. 1, the X axis, the Y axis and the Z axis are vertical to each other, the Z axis corresponds to the lamination direction of the inside dielectric layers 10 and the internal electrode layers 12, and the Y axis corresponds to the direction in which the lead-out regions 15A, 15B (lead-out sections 12A, 12B) are formed.

The shape and size of the element body 3 may be suitably decided according to its purpose or application, and it is preferable that the width W0 in the X axis direction ranges from 0.1 mm to 1.6 mm, the length L0 in the Y axis direction ranges from 0.2 mm to 3.2 mm, and the height H0 in the Z axis direction ranges from 0.1 mm to 1.6 mm.

In the present embodiment, as shown in FIG. 2, the section in the insulating layers 16, from the end surface of the element body 3 in the X axis direction to the external surface of the insulating layers 16 along the width direction (the X axis direction) of the ceramic sintered body 4, is called a gap section.

In the present embodiment, the width Wgap of the gap section in the X axis direction corresponds to the size from the end surface of the element body 3 in the X axis direction to the end surface of the insulating layers 16 in the X axis direction along the width direction (X axis direction) of the ceramic sintered body 4, but it is not necessary for the width Wgap to be even along the Z axis direction, and a little variation is allowed. The width Wgap is preferably 0.5-30 μm, much lower than the width W0 of the element body 3.

By setting Wgap in the above range, cracks are hard to emerge, and even if the ceramic sintered body 4 is more miniaturized, the electrostatic capacitance decreases little.

In the present embodiment, as shown in FIG. 2, covering sections 16a, which cover the X axis direction ends of the two end surfaces of the element body 3 in the Z axis direction, are formed integrally with the insulating layers 16 at both ends of the insulating layers 16 in the Z axis direction. The respective width W1 in the X axis direction from the two end surfaces of the element body 3 in the X axis direction to the covering section 16 is zero or more and is at most ½ of the width W0. In addition, the width W1/W0 is preferably ¹⁄₁₀₀-¹⁄₁₀. By setting W1/W0 in such a range, high sealability can be maintained and thermal shock resistance can be raised.

Moreover, the width Wgap on the two sides of the ceramic sintered body 4 in the X axis direction can be the same or different from each other. Besides, the width W1 on the two sides of the ceramic sintered body 4 in the X axis direction can also be the same or different from each other. It is preferred that the insulating layers 16 do not cover the two end surfaces of the element body 3 shown in FIG. 1 in the Y axis direction. The reason is that it is necessary to form the external electrodes 6, 8 on the two end surfaces of the element body 3 in the Y axis direction to connect with the internal electrodes 12. The external electrodes 6, 8 may cover a part of the Y axis direction ends of the covering sections 16a shown in FIG. 2, or may cover a part of the Y axis direction ends of the insulating layers 16.

There is no special limit on the ratio of a thickness td of the inside dielectric layers 10 to a thickness to of the internal electrode layers 12, and td/te is preferably 2-0.5. There is also no special limit on the ratio of a thickness to of the exterior regions 11 to a height H0 of the element body 3, and to/H0 is preferably 0.01-0.05.

The Manufacturing Method of the Multilayer Ceramic Capacitor

Next, the manufacturing method of the multilayer ceramic capacitor 2 as one embodiment of the present invention is described in detail.

First, prepare paste for inside green sheet and paste for outside green sheet to manufacture an inside green sheet which forms, after firing, the inside dielectric layers 10 shown in FIG. 1 and an outside green sheet which forms the outside dielectric layers.

The paste for the inside green sheet and the paste for the outside green sheet are usually constituted by organic solvent based paste, obtained by kneading the ceramic powder with organic vehicle, or by water based paste.

The raw material of the ceramic powder can be suitably chosen from compounds that become complex oxides or oxides, such as carbonates, nitrates, hydroxides, organic metal compounds, and be mixed for use. In the present embodiment, the raw material of the ceramic powder is used in the form of powder with an average particle size of less than 0.45 μm, preferably about 0.1-0.3 μm. Moreover, in order to make extremely thin inside green sheet, it is ideal to use powder that is finer than the thickness of the green sheet.

The organic vehicle is obtained by solving a binder in an organic solvent. There is no special limit on the binder used in the organic vehicle as long as it is suitably chosen from common binders such as ethyl cellulose, polyvinyl butyral. There is also no special limit on the organic solvent as long as it is suitably chosen from organic solvents such as acetone, toluene.

In addition, the paste for green sheet may include additives chosen from various dispersants, plasticizers, dielectrics, subcomposition compounds, glass frit, insulators, and etc. when necessary.

The plasticizer may take phthalate esters such as dioctyl phthalate or benzyl butyl phthalate, adipic acid, phosphate and glycol as an example.

Besides, the paste for inside green sheet and the paste for outside green sheet may use the same paste for green sheet or different pastes for green sheet.

Next, prepare paste for internal electrode layers to manufacture the internal electrode pattern layers which form, after firing, the internal electrode layers 12 shown in FIG. 1. The paste for internal electrode layers is prepared by kneading the conductive materials including the above mentioned conductive metals or alloys with the organic vehicle.

The paste for external electrodes which form, after firing, the external electrodes 6, 8 shown in FIG. 1 is prepared in the same way as the paste for internal electrode layers does.

Use the above-mentioned prepared paste for inside green sheet and the paste for internal electrode layers to alternately laminate the inside green sheets with the internal electrode pattern layers in order to manufacture an inner multilayer body. Then, after the inner multilayer body is manufactured, use the paste for outside green sheet to form outside green sheets, and apply pressure in the lamination direction to obtain a green multilayer body.

There is no special limit on the method to form internal electrode pattern layers. The internal electrode pattern layers may be formed by printing method or transcription method using the paste for internal electrode layer, or by a thin-film forming method such as evaporation or sputtering without using paste for internal electrode layer.

Besides, as to the manufacturing method of the green multilayer body, the green multilayer body may also be obtained by directly laminating a specific number of the inside green sheets and the internal electrode pattern layers on the outside green sheets and applying pressure in the lamination direction.

Next, cut the green multilayer body to obtain a green chip.

The green chip is removed from the plasticizer and is solidified thereof by solidification drying. The green chip after the solidification drying is put into a barrel container together with media and polish liquid, and is barrel polished by a horizontal centrifugal barrel machine. The green chip after barrel polishing is washed by water and dried. The element body 3 is obtained by performing a binder removing step, a firing step, and when necessary, an annealing step to the green chip after drying.

The binder removing step, the firing step and the annealing step may be performed continuously or independently.

End surface polishing may be performed to the two end surfaces in the Z axis direction and the two end surfaces in the Y axis direction of the element body 3 obtained above by barrel polishing or sandblast and so on.

Next, coat paste for insulating layer to the two end surfaces of the element body 3 in the X axis direction and perform sintering to form the insulating layers 16 and obtain the ceramic sintered body 4 shown in FIG. 1 and FIG. 2. The paste for insulating layer is obtained, for example, by kneading the glass raw material, the ceramic filler, the binder with ethyl cellulose as the main composition, and the dispersant such as terpineol and acetone with a mixer.

There is no special limit on the way to coat the paste for insulating layer onto the element body 3, for example, methods such as dipping, printing, coating, evaporation and spraying can be exemplified.

There is no limit on the baking condition of the element body 3 coated with the paste for insulating layer, for example, the baking can be performed by being retained in a wet $N_2$ or dry $N_2$ atmosphere at 700° C.-1300° C. for 0.1-3 hours.

End surface polishing may be performed by barrel polishing, sandblast, etc. to the two end surfaces in the Z axis direction and to the same in the Y axis direction of the ceramic sintered body 4 obtained by the above method.

Next, paste for external electrode is coated to the two end surfaces in the Y axis direction of the ceramic sintered body to which the sintered insulating layers 16 is baked, and firing thereof to form the external electrodes 6, 8. The external electrodes 6, 8 may be formed before or after or at the same time with the formation of the insulating layers 16.

There is also no special limit on the method to form the external electrodes 6, 8, proper methods such as coating and sintering, plating, evaporation and sputtering of the paste for external electrode can be used.

Then, a covering layer is formed by such as plating on the surface of the external electrodes 6, 8, when necessary.

The multilayer ceramic capacitor 2 of the present embodiment manufactured as above is mounted to such as a print substrate by such as a soldering to be utilized in various electronic devices.

In the present embodiment, the insulating layers 16 are formed on the element body 3 by baking the paste for insulating layer on the fired element body 3. By using this method, the moisture resistance becomes good, and the resistance to external environment changes such as thermal shock or physical shock can be improved.

Although the embodiments of the present invention have been described in detail, the present invention is not limited to the embodiments, and various changes can be made without departing from the essence of the present invention.

The multilayer electronic component of the present invention can be applied to other multilayer electronic components, without limiting to the multilayer ceramic capacitor. Other multilayer electronic components are all the electronic components whose dielectric layers are laminated via the internal electrodes, and band-pass filters, inductors, multilayer three-terminal filters, piezoelectric elements, PTC thermistors, NTC thermistors and varistors, etc. can be exemplified.

EXAMPLES

The present invention is further illustrated based on specific examples below, but the present invention is not limited thereto.

First, 100 parts by mass of $BaTiO_3$ powder as the main composition of the dielectric material and 0.5 part by mass of $SiO_2$, 0.8 part by mass of $Y_2O_3$, 0.5 part by mass of MgO and 1.0 part by mass of MnO as the subcomposition of the dielectric material were prepared.

Next, the prepared 100 parts by mass of $BaTiO_3$ powder and the raw material of the subcomposition were wet grinded by a ball mill for 15 hours, dried thereof to obtain the raw material (dielectrics raw material) of the dielectric material.

Next, 100 parts by mass of the obtained dielectric raw material, 10 parts by mass of polyvinyl butyral resin, 5 parts by mass of dioctyl phthalate (DOP) as the plasticizer, and 100 parts by weight of alcohol as the solvent were mixed by the ball mill, pasted thereof and obtained the paste for the green sheet.

In addition, 44.6 parts by mass of Ni particles, 52 parts by mass of terpineol, 3 parts by mass of ethyl cellulose, and 0.4 part by mass of benzotriazole were kneaded by a three roll mill, and slurried thereof to make the paste for the internal electrode layer.

The paste for green sheet manufactured above was used to form an inside green sheet on the PET film. Next, an internal electrode pattern layer was formed on said inside green sheet using the paste for the internal electrode layer, and obtained an inside green sheet having an internal electrode pattern layer.

The inside green sheet having the internal electrode pattern layer was laminated to manufacture an inner multilayer body, after which the paste for green sheet is used on and under the inner multilayer body to form proper pieces of outside green sheets, and then pressure is applied thereof in the lamination direction to obtain a green multilayer body.

Next, the green multilayer body was cut to obtain green chips.

Next, binder removing treatment, firing and annealing under the conditions below were performed to the obtained green chips to obtain the element body 3.

As to the conditions for binder removing treatment, the rate of temperature increase was 25° C./hour, the retaining temperature was 235° C., the retaining time was 8 hours and the atmosphere was the air.

As to the firing conditions, the rate of temperature increase was 600-1000° C./hour, the retaining temperature was 1100-1150° C., and the retaining time was 1 hour. The rate of temperature decrease was 200° C./hour. Besides, the atmosphere gas was humidified mixed gas of $N_2$ and $H_2$, and the oxygen partial pressure was $10^{-12}$ MPa.

As to the annealing conditions, the rate of temperature increase was 200° C./hour, the retaining temperature was 1050° C., the retaining time was 3 hours, the rate of temperature decrease was 200° C./hour, and the atmosphere gas was humidified $N_2$ gas (oxygen partial pressure: $10^{-7}$ MPa).

The humidification of the atmosphere gas used in the firing and annealing was done by a wetter.

Next, the glass powder with the glass composition shown in Table 1, the ceramic filler having ceramic filler composition, the binder including ethyl cellulose as the main composition, and terpineol and acetone as the dispersant were kneaded by the mixer to prepare the paste for insulating layer. Note, the values shown in Table 1 are wt %.

The paste for insulating layer was coated to the end surface of the element body 3 in the X axis direction and retained in dry $N_2$ atmosphere in 1000° C. for 2 hours and then baked, by which the insulating layers 16 were formed on the element body 3 to obtain the ceramic sintered body 4. The thickness of the gap section of the insulating layers 16 was 10-30 μm.

Next, the external electrodes 6, 8 were formed on the ceramic sintered body 4 to obtain a capacitor sample (the multilayer ceramic capacitor 2). The obtained capacitor samples were evaluated according to the method below.

<The Content Ratio of the Ceramic Composition>

The content ratio of the ceramic composition was calculated by using an SEM-EDX apparatus to analyze the insulating layers 16. As to the specific analyzing method, first, the capacitor sample was polished till the cross section along the II-II line in FIG. 1 (from the end to the place where a length in the Y axis direction is L0/2 in the element body 3). Next, a measuring region of 15 μm×5 μm was set inside the insulating layers 16 so that the (H0/2) position in the Z axis direction became the center. Then, having the measuring region at the center, two measuring regions of 15 μm×5 μm inside the insulating layers 16 in the front and back of said measuring region in the Z axis direction were set without contacting said measuring region. The position of the X axis direction at this moment was not specified in particular, but it is desirable that the position does not adjoin the boundary of the insulating layers 16 and the inside dielectric layers 10 in FIG. 2 so that accurate plane analysis which detects the composition of the dielectric layer can be realized. The SEM-EDX apparatus was used to perform plane analysis to all the three measuring regions, then the content ratio of the ceramic composition in each measuring region were measured considering the results, and figured the average value thereof. Moreover, when the glass composition overlaps the ceramic composition, the content ratio of the ceramic composition was obtained by setting the element with the highest detection precision in the glass composition (for example, $SiO_2$ composition) as the standard of the glass composition and figuring out the content ratio of the glass composition. In addition, when the thickness of the insulating layers 16 was less than 5 μm, the length of each measuring region in the X axis direction was determined the same as the thickness of the insulating layers 16. The length in the Z axis direction was set to 15 μm. The results are shown in the tables.

<The Generation Rate of Cracks in the Gap Section>

Sandblast was used to scratch the side surface of the capacitor sample on which the insulating layers 16 are formed. The conditions of the sandblast were 0.4 MPa for 5 seconds. Next, resin-embedded polishing was performed to the cross section of the capacitor sample. The resin-embedded polishing was performed till the cross section along the II-II line in FIG. 1 (from the end to the place where a length in the Y axis direction is L0/2 in the element body 3). The cross section was observed, and whether cracks generate in the gap section and whether cracks reach the element body 3 were observed. The process was performed on 100 capacitor samples, and the rate of capacitor samples 2 which have cracks were defined as the crack generation rate. Further, the rate of the capacitor samples 2 which have cracks reaching the element body 3 (sometimes referred to as green body cracks hereinafter) was defined as generation rate of cracks reaching the element body. Then, the rate of the capacitor samples 2 without cracks that reach the element body 3 to the capacitor samples 2 with cracks was defined as the prevention rate of the cracks reaching the element body (sometimes referred to as the green-body-reaching prevention rate hereinafter). The result is shown in the tables.

The green body crack generation rate was regarded as good when below 25%, better when 15% or less, and the best when 5% or less. In the tables, ⊚ defines a rate of 5% or less, ○ defines a rate ranging from more than 5% to 15% or less, Δ defines a rate ranging from more than 15% to less than 30%, and × defines a rate of 25% or more.

The crack generation rate was regarded as good when below 35%, better when 25% or less, and the best when below 10%. In the tables, ⊚ defines a rate below 10%, ○ defines a rate ranging from 10% or more to 25% or less, Δ defines a rate ranging from more than 25% to less than 35%, and × defines a rate of 35% or more.

The green-body-reaching prevention rate was regarded as good when 20% or more, better when 40% or more, and the best when above 80% or when the crack generation rate was 0%. In the tables, ⊚ defines a rate above 80% or a crack generation rate of 0%, ○ defines a rate ranging from 40% or more to 80% or less, Δ defines a rate ranging from 20% or more to less than 40%, and × defines a rate below 20%.

<Moisture Resistance Experiment>

The moisture resistance experiment was performed to 10 capacitor samples 2 before the sandblast and 10 capacitor samples 2 after the sandblast. And withstand voltage experiment was performed to each capacitor sample after the moisture resistance experiment, and evaluated the decreasing rate of the average withstand voltage after the sandblast to the average withstand voltage before the sandblast. The decreasing rate (%) was figured out with the formula {(Vb/Va)−1}×100, taking the average withstand voltage before the sandblast as Va and the average withstand voltage after the sandblast as Vb.

The moisture resistance experiment was done by being exposed to a 80% humidified atmosphere for 100 hours. The withstand voltage was measured at a voltage increase rate of 10 V/s. The result is shown in the tables.

It was regarded as good when the absolute value of the withstand voltage decreasing rate was 30% or less, better when 20% or less, and the best when 5% or less. Note, the situation when the withstand voltage decreasing rate was positive (Va<Vb) was always the best. In the tables, ⊚ defines a rate of 5% or less, ○ defines a rate ranging from more than 5% to 20% or less, Δ defines a rate ranging from more than 20% to 30% or less, and × defines a rate above 30%.

<Strain Experiment>

Figure 3:
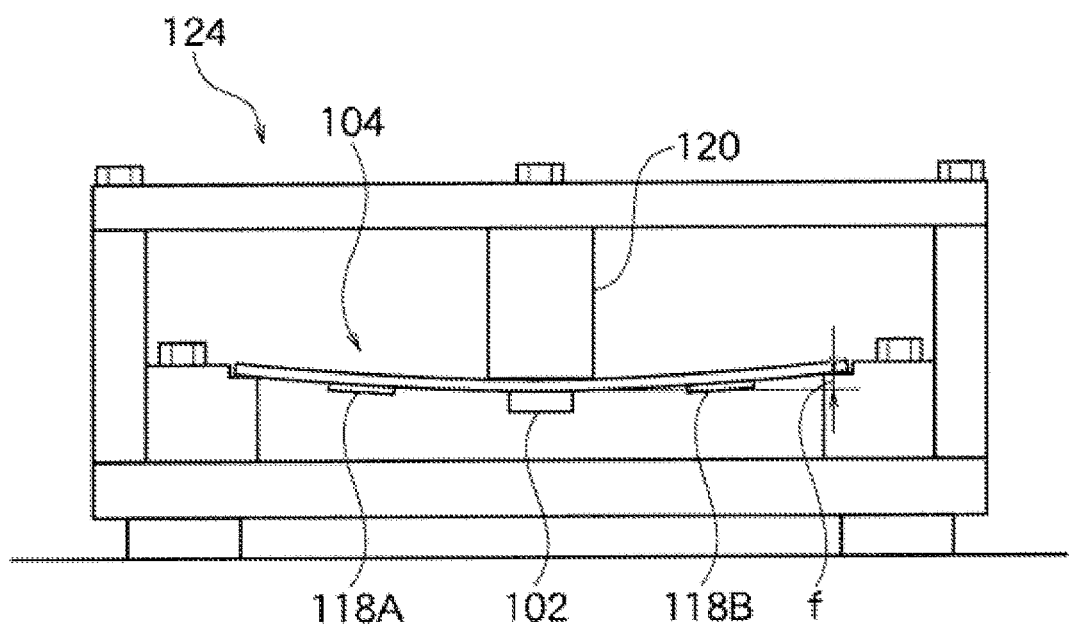
FIG. 3 is a schematic view illustrating a method for strain experiment of the example.

As shown in FIG. 3, the external electrode of the capacitor sample 102 was mounted to the pad section of the substrate 104 for experiment by soldering. The material of the substrate 104 for experiment was epoxy resin with glass cloth backing. The substrate 104 for experiment was 40 mm wide in the X axis direction, 100 mm long in the Y axis direction and 0.8 mm thick.

The substrate 104 for experiment was disposed in an apparatus 124 shown in FIG. 3, pressed the substrate 104 for experiment by a pressing part 120 so that the strain becomes 10 mm and maintained for 5 seconds, then a LCR meter was connected with experiment terminals 118A and 118B (respectively connected with the external electrodes of the capacitor sample 102 via wires) shown in FIG. 3 to measure the electrostatic capacitance. The electrostatic capacitance was measured under a frequency of 1 kHz and 0.5 Vrm. When the electrostatic capacitance before pressing was C, and difference with the electrostatic capacitance after pressing was ΔC, it is judged qualified when ΔC/C is ±10% or less. This operation was performed to 20 capacitor samples, and it is regarded as good when a number of the unqualified samples were 3 or less, and better when there is no unqualified sample. The result is shown in the tables. In the tables, ⊚ defines the cases with no unqualified samples in the strain experiment, ○ defines the cases with 3 or less unqualified samples in the strain experiment, and Δ defines the cases with more than 3 unqualified samples in the strain experiment. Note, the internal structure of the capacitor sample 102 of this example is the same as the multilayer ceramic capacitor 2 shown in FIG. 1.

<The Change in Glass Weight after the Plating Tolerance Experiment>

The paste for the insulating layer was coated to the ceramic substrate that forms each capacitor sample 2 and performed baking. The surface area of the glass on the ceramic substrate was 1 cm². The glass substrate was dipped in water solution with pH of three for 60 hours at room temperature. Then, the change in weight of the ceramic substrate, to which glass was baked, was calculated before and after the dipping. The results are shown in the tables 3 and 4. In this example, the preferable range for the decrease in glass weight after the plating tolerance experiment is defined less than 3 mg, and the more preferable range is defined less than 1 mg. The results are shown in the tables. In the tables, ⊚ defines that the decreasing rate of glass weight after the plating tolerance experiment is less than 1 mg, ○ defines that the plating tolerance of 1 mg or more to less than 3 mg, and × defines that the plating tolerance of 3 mg or more.

TABLE 1

| No. | Glass Composition (wt %) | | | | | | | | Ceramic Filler | | Crack Generation Rate | | | | | | Result of the Moisture Resistance Experiment | | | | Strain Experiment | Plating Tolerance |
|---|---|---|---|---|---|---|---|---|---|---|---|---|---|---|---|---|---|---|---|---|---|---|
| | | | | | Alkali Metal Composition | | | | Composition | | Green Body | | Crack Generation Rate | | Green-body-reaching Prevention Rate | | Before Sandblast Withstand Voltage (Ave)V | After Sandblast Withstand Voltage (Ave)V | Comparison Before And After Sandblast % | Evaluation | | |
| | SiO₂ | Na₂O | K₂O | Li₂O | | BaO | Al₂O₃ | Total | Kind of Filler Composition | Content in the Whole Insulating Layer/wt % | Evaluation | Crack Generation Rate/% | Evaluation | Generation Rate/% | Evaluation | Prevention Rate/% | | | | | | |
| Example 1 | 44 | 13 | 12 | 3 | 28 | 23 | 5 | 100 | Al₂O₃ | 20 | ◎ | 4 | ○ | 13 | ○ | 69 | 87 | 83 | -5 | ◎ | ○ | ◎ |
| 2 | 44 | 13 | 12 | 3 | 28 | 23 | 5 | 100 | Al₂O₃ | 45 | ◎ | 1 | ◎ | 8 | ◎ | 88 | 86 | 88 | 2 | ◎ | ◎ | ◎ |
| 3 | 44 | 13 | 12 | 3 | 28 | 23 | 5 | 100 | Al₂O₃ | 55 | ○ | 0 | ◎ | 9 | ◎ | 100 | 89 | 88 | -1 | ◎ | ○ | ◎ |
| 4 | 44 | 13 | 12 | 3 | 28 | 23 | 5 | 100 | Al₂O₃ | 72 | ○ | 6 | ○ | 16 | ○ | 63 | 84 | 79 | -6 | ○ | ○ | ◎ |
| 5 | 44 | 13 | 12 | 3 | 28 | 23 | 5 | 100 | Al₂O₃ | 8 | ◎ | 9 | ○ | 20 | ○ | 55 | 87 | 80 | -8 | ○ | ◎ | ◎ |
| 6 | 44 | 13 | 12 | 3 | 28 | 23 | 5 | 100 | Al₂O₃ | 15 | ◎ | 4 | ◎ | 15 | ○ | 73 | 84 | 80 | -5 | ◎ | ○ | ◎ |
| 7 | 44 | 13 | 12 | 3 | 28 | 23 | 5 | 100 | ZrO₂ | 40 | ◎ | 0 | ◎ | 9 | ◎ | 100 | 91 | 89 | -2 | ◎ | ◎ | ◎ |
| 8 | 44 | 13 | 12 | 3 | 28 | 23 | 5 | 100 | ZrO₂ | 55 | ○ | 1 | ◎ | 8 | ◎ | 88 | 87 | 87 | 0 | ◎ | ○ | ◎ |
| 9 | 44 | 13 | 12 | 3 | 28 | 23 | 5 | 100 | ZrO₂ | 4 | ◎ | 8 | ○ | 16 | ○ | 50 | 89 | 78 | -12 | ○ | ◎ | ◎ |
| 10 | 44 | 13 | 12 | 3 | 28 | 23 | 5 | 100 | ZrO₂ | 74 | ○ | 6 | ○ | 19 | ○ | 68 | 88 | 80 | -9 | ○ | ◎ | ◎ |
| 11 | 44 | 13 | 12 | 3 | 28 | 23 | 5 | 100 | TiO₂ | 23 | ◎ | 3 | ◎ | 11 | ○ | 73 | 89 | 85 | -4 | ◎ | ○ | ◎ |
| 12 | 44 | 13 | 12 | 3 | 28 | 23 | 5 | 100 | TiO₂ | 55 | ○ | 1 | ◎ | 8 | ◎ | 88 | 85 | 83 | -2 | ◎ | ○ | ◎ |
| 13 | 44 | 13 | 12 | 3 | 28 | 23 | 5 | 100 | TiO₂ | 40 | ◎ | 0 | ◎ | 7 | ◎ | 100 | 80 | 80 | 0 | ◎ | ◎ | ◎ |
| 14 | 44 | 13 | 12 | 3 | 28 | 23 | 5 | 100 | TiO₂ | 76 | ○ | 7 | ○ | 16 | ○ | 56 | 83 | 77 | -7 | ○ | ○ | ◎ |
| 15 | 44 | 13 | 12 | 3 | 28 | 23 | 5 | 100 | TiO₂ | 6 | ◎ | 8 | ○ | 13 | ○ | 38 | 88 | 79 | -10 | ○ | ◎ | ◎ |
| 16 | 44 | 13 | 12 | 3 | 28 | 23 | 5 | 100 | CeO₂ | 11 | ◎ | 4 | ◎ | 15 | ○ | 73 | 83 | 79 | -5 | ◎ | ○ | ◎ |
| 17 | 44 | 13 | 12 | 3 | 28 | 23 | 5 | 100 | CeO₂ | 30 | ○ | 1 | ◎ | 6 | ◎ | 83 | 90 | 90 | 0 | ◎ | ○ | ◎ |
| 18 | 44 | 13 | 12 | 3 | 28 | 23 | 5 | 100 | CeO₂ | 50 | ○ | 1 | ◎ | 9 | ◎ | 89 | 86 | 86 | 0 | ◎ | ◎ | ◎ |
| 19 | 44 | 13 | 12 | 3 | 28 | 23 | 5 | 100 | CeO₂ | 6 | ◎ | 7 | ○ | 15 | ○ | 53 | 88 | 77 | -13 | ○ | ◎ | ◎ |
| 20 | 44 | 13 | 12 | 3 | 28 | 23 | 5 | 100 | CeO₂ | 73 | ○ | 9 | ○ | 16 | ○ | 44 | 89 | 79 | -11 | ○ | ○ | ◎ |
| 21 | 44 | 13 | 12 | 3 | 28 | 23 | 5 | 100 | CuO | 20 | ◎ | 4 | ◎ | 10 | ○ | 60 | 85 | 84 | -1 | ◎ | ○ | ◎ |
| 22 | 44 | 13 | 12 | 3 | 28 | 23 | 5 | 100 | CuO | 40 | ◎ | 0 | ◎ | 7 | ◎ | 100 | 86 | 84 | -2 | ◎ | ◎ | ◎ |
| 23 | 44 | 13 | 12 | 3 | 28 | 23 | 5 | 100 | CuO | 56 | ○ | 0 | ◎ | 8 | ◎ | 100 | 87 | 84 | -1 | ◎ | ○ | ◎ |
| 24 | 44 | 13 | 12 | 3 | 28 | 23 | 5 | 100 | CuO | 8 | ◎ | 7 | ○ | 15 | ○ | 53 | 88 | 73 | -16 | ○ | ◎ | ◎ |
| 25 | 44 | 13 | 12 | 3 | 28 | 23 | 5 | 100 | CuO | 71 | ○ | 6 | ○ | 15 | ○ | 60 | 84 | 82 | -7 | ○ | ○ | ◎ |
| 26 | 44 | 13 | 12 | 3 | 28 | 23 | 5 | 100 | CoO | 8 | ◎ | 4 | ◎ | 9 | ◎ | 56 | 83 | 80 | -5 | ◎ | ○ | ◎ |
| 27 | 44 | 13 | 12 | 3 | 28 | 23 | 5 | 100 | CoO | 30 | ◎ | 0 | ◎ | 8 | ◎ | 100 | 89 | 82 | -1 | ◎ | ○ | ◎ |
| 28 | 44 | 13 | 12 | 3 | 28 | 23 | 5 | 100 | CoO | 42 | ◎ | 0 | ◎ | 6 | ◎ | 100 | 88 | 87 | -2 | ◎ | ◎ | ◎ |
| 29 | 44 | 13 | 12 | 3 | 28 | 23 | 5 | 100 | CoO | 54 | ◎ | 0 | ◎ | 7 | ◎ | 100 | 85 | 86 | -2 | ◎ | ◎ | ◎ |
| 30 | 44 | 13 | 12 | 3 | 28 | 23 | 5 | 100 | CoO | 75 | ○ | 6 | ○ | 11 | ○ | 45 | 85 | 80 | -6 | ○ | ○ | ◎ |

TABLE 2

| No. | SiO₂ | Na₂O | K₂O | Li₂O | Alkali Metal Composition | BaO | Al₂O₃ | Total | Kind of Filler Composition | Content in the Whole Insulating Layer/wt% | Green Body Crack Evaluation | Green Body Crack Generation Rate/% | Crack Generation Rate Evaluation | Crack Generation Rate/% | Green-body-reaching Prevention Evaluation | Prevention Rate/% | Before Withstand Voltage (Ave)V | After Sandblast Withstand Voltage (Ave)V | Before And After Sandblast Comparison/% | Evaluation | Strain Experiment | Plating Tolerance |
|---|---|---|---|---|---|---|---|---|---|---|---|---|---|---|---|---|---|---|---|---|---|---|
| Example 32 | 44 | 13 | 12 | 3 | 28 | 23 | 5 | 100 | ZnO | 9 | ○ | 11 | ○ | 19 | ○ | 42 | 86 | 76 | −12 | ○ | ○ | ◎ |
| 33 | 44 | 13 | 12 | 3 | 28 | 23 | 5 | 100 | ZnO | 24 | ◎ | 3 | ◎ | 10 | ○ | 70 | 89 | 85 | −4 | ◎ | ◎ | ◎ |
| 34 | 44 | 13 | 12 | 3 | 28 | 23 | 5 | 100 | ZnO | 57 | ◎ | 4 | ◎ | 9 | ○ | 56 | 83 | 80 | −4 | ○ | ○ | ◎ |
| 35 | 44 | 13 | 12 | 3 | 28 | 23 | 5 | 100 | ZnO | 76 | ○ | 11 | ○ | 20 | ○ | 45 | 86 | 75 | −13 | ○ | ◎ | ◎ |
| 36 | 44 | 13 | 12 | 3 | 28 | 23 | 5 | 100 | MnO | 14 | ◎ | 4 | ◎ | 19 | ○ | 79 | 84 | 80 | −5 | ◎ | ◎ | ◎ |
| 37 | 44 | 13 | 12 | 3 | 28 | 23 | 5 | 100 | MnO | 34 | ◎ | 1 | ◎ | 9 | ◎ | 89 | 86 | 82 | −5 | ◎ | ◎ | ◎ |
| 38 | 44 | 13 | 12 | 3 | 28 | 23 | 5 | 100 | MnO | 49 | ◎ | 1 | ◎ | 9 | ◎ | 89 | 84 | 83 | −1 | ◎ | ◎ | ◎ |
| 39 | 44 | 13 | 12 | 3 | 28 | 23 | 5 | 100 | MnO | 74 | ○ | 11 | ○ | 22 | ○ | 50 | 86 | 76 | −12 | ○ | ◎ | ◎ |
| 40 | 44 | 13 | 12 | 3 | 28 | 23 | 5 | 100 | Fe₂O₃ | 29 | ◎ | 4 | ◎ | 15 | ○ | 73 | 83 | 81 | −2 | ◎ | ◎ | ◎ |
| 41 | 44 | 13 | 12 | 3 | 28 | 23 | 5 | 100 | Fe₂O₃ | 56 | ◎ | 4 | ◎ | 9 | ○ | 56 | 84 | 83 | −1 | ○ | ◎ | ◎ |
| 42 | 44 | 13 | 12 | 3 | 28 | 23 | 5 | 100 | Fe₂O₃ | 72 | ○ | 12 | ○ | 21 | ○ | 43 | 90 | 80 | −11 | ○ | ◎ | ◎ |
| 43 | 44 | 13 | 12 | 3 | 28 | 23 | 5 | 100 | BaO | 32 | ○ | 10 | ○ | 25 | ○ | 60 | 84 | 72 | −14 | ◎ | ◎ | ◎ |
| 44 | 44 | 13 | 12 | 3 | 28 | 23 | 5 | 100 | BaO | 56 | ◎ | 5 | ◎ | 20 | ○ | 75 | 90 | 86 | −4 | ◎ | ◎ | ◎ |
| 45 | 44 | 13 | 12 | 3 | 28 | 23 | 5 | 100 | BaO | 8 | △ | 16 | △ | 26 | △ | 38 | 88 | 65 | −26 | △ | ○ | ◎ |
| 46 | 44 | 13 | 12 | 3 | 28 | 23 | 5 | 100 | BaO | 74 | △ | 19 | △ | 26 | △ | 27 | 86 | 66 | −23 | △ | ○ | ◎ |
| 47 | 44 | 13 | 12 | 3 | 28 | 23 | 5 | 100 | CaO | 15 | ○ | 11 | ○ | 26 | △ | 58 | 89 | 78 | −12 | ○ | ◎ | ◎ |
| 48 | 44 | 13 | 12 | 3 | 28 | 23 | 5 | 100 | CaO | 33 | ◎ | 7 | ○ | 19 | ○ | 63 | 90 | 82 | −9 | ○ | ◎ | ◎ |
| 49 | 44 | 13 | 12 | 3 | 28 | 23 | 5 | 100 | CaO | 72 | △ | 16 | △ | 26 | △ | 38 | 88 | 75 | −15 | △ | ○ | ◎ |
| 50 | 44 | 13 | 12 | 3 | 28 | 23 | 5 | 100 | CaO | 50 | ◎ | 5 | ◎ | 25 | ○ | 80 | 87 | 83 | −5 | ◎ | ◎ | ◎ |
| 51 | 44 | 13 | 12 | 3 | 28 | 23 | 5 | 100 | SrO | 5 | △ | 16 | △ | 26 | △ | 38 | 89 | 72 | −19 | △ | ○ | ◎ |
| 52 | 44 | 13 | 12 | 3 | 28 | 23 | 5 | 100 | SrO | 42 | ○ | 5 | ○ | 17 | ○ | 71 | 85 | 81 | −5 | ◎ | ◎ | ◎ |
| 53 | 44 | 13 | 12 | 3 | 28 | 23 | 5 | 100 | SrO | 73 | △ | 17 | △ | 25 | △ | 32 | 86 | 70 | −19 | △ | ○ | ◎ |
| 54 | 44 | 13 | 12 | 3 | 28 | 23 | 5 | 100 | metal (Fe) | 20 | △ | 26 | △ | 30 | △ | 13 | 87 | 50 | −43 | △ | ○ | ◎ |
| 55 | 44 | 13 | 12 | 3 | 28 | 23 | 5 | 100 | heat resistant resin | 26 | X | 45 | X | 45 | X | 0 | 89 | 54 | −39 | X | ○ | ◎ |
| Comparative Example 56 | Barium Titanate (non-glass) | | | | | | | | — | 0 | X | 32 | △ | 33 | X | 3 | 89 | 50 | −44 | X | △ | ◎ |
| 57 | 44 | 13 | 12 | 3 | 28 | 23 | 5 | 100 | — | — | X | 25 | △ | 30 | X | 17 | 86 | 59 | −31 | X | ○ | ◎ |

Samples No. 1-57 in Table 1 and Table 2, except sample No. 56, used the same glass composition in the insulating layers 16 and changed the kind and content of the ceramic composition. Sample No. 54 (the comparative example) used metal particles (Fe particles) instead of the ceramic filler. And sample No. 55 (the comparative example) used heat resistant resin particles instead of the ceramic filler. Polyimide resin was used as the heat resistant resin. In sample No. 56 (the comparative example), the insulating layers 16 was made only from barium titanate (non-glass). Sample No. 57 (the comparative example) did not use the ceramic filler.

According to Table 1 and Table 2, comparing with samples No. 54-57 which do not contain the ceramic composition in the insulating layers 16, samples No. 1-53 which form the insulating layers 16 with the glass composition and the ceramic composition had less cracks reaching the green body, the rate of which was below 25%.

The samples whose content of the ceramic composition in the insulating layers 16 is 10-70 wt % tended to be excellent in the generation rate of cracks reaching the green body, the crack generation rate, the crack prevention rate and the result of the moisture resistance experiment, comparing with the samples outside the range of 10-70 wt %.

The samples whose content of the ceramic composition is 30-60 wt % tended to be more excellent in the generation rate of cracks reaching the green body, the crack generation rate, the crack prevention rate and the result of the moisture resistance experiment. Furthermore, the samples whose content of the ceramic composition is 40-60 wt % tended to be even more excellent in the generation rate of cracks reaching the green body and the result of the moisture resistance experiment.

In the cases when the oxides of elements chosen from Al, Zr, Ti, Ce, Fe, Mn, Cu, Co and Zn are contained as the ceramic filler in the insulating layers 16, it tended to be excellent in the generation rate of cracks reaching the green body, the crack generation rate, the crack prevention rate and the result of the moisture resistance experiment, comparing with the cases which do not contain the oxides of the above-mentioned elements. Furthermore, in the cases when the oxides of elements chosen from Al, Zr, Ti, Ce, Mn, Cu and Co are contained, the crack prevention rate tended to be excellent comparing with the cases which do not contain the oxides of elements chosen from Al, Zr, Ti, Ce, Mn, Cu and Co.

TABLE 3

| | No. | SiO$_2$ | Na$_2$O | K$_2$O | Li$_2$O | Alkali Metal Composition | CaO | SrO | BaO | Al$_2$O$_3$ | B$_2$O$_3$ | total | Kind of Filler Composition | Content/wt % |
|---|---|---|---|---|---|---|---|---|---|---|---|---|---|---|
| Example | 58 | 66 | 7 | 7 | 2 | 16 | 7 | | 7 | 4 | | 100 | Al$_2$O$_3$ | 50 |
| | 59 | 66 | 7 | 7 | 2 | 16 | 7 | | 7 | 4 | | 100 | ZrO$_2$ | 50 |
| | 60 | 66 | 7 | 7 | 2 | 16 | 7 | | 7 | 4 | | 100 | CuO | 50 |
| | 61 | 66 | 7 | 7 | 2 | 16 | 7 | | 7 | 4 | | 100 | CoO | 50 |
| | 62 | 66 | 7 | 7 | 2 | 16 | 7 | | 7 | 4 | | 100 | TiO$_2$ | 50 |
| | 63 | 80 | | | | 0 | 4 | 12 | | | 4 | 100 | Al$_2$O$_3$ | 50 |
| | 64 | 80 | | | | 0 | 4 | 12 | | | 4 | 100 | ZrO$_2$ | 50 |
| | 65 | 80 | | | | 0 | 4 | 12 | | | 4 | 100 | CuO | 50 |
| | 66 | 80 | | | | 0 | 4 | 12 | | | 4 | 100 | CoO | 50 |
| | 67 | 80 | | | | 0 | 4 | 12 | | | 4 | 100 | TiO$_2$ | 50 |
| | 68 | 30 | 2 | 4 | 1 | 7 | 10 | 10 | 5 | 6 | 32 | 100 | Al$_2$O$_3$ | 50 |
| | 69 | 30 | 2 | 4 | 1 | 7 | 10 | 10 | 5 | 6 | 32 | 100 | ZrO$_2$ | 50 |
| | 70 | 30 | 2 | 4 | 1 | 7 | 10 | 10 | 5 | 6 | 32 | 100 | CuO | 50 |
| | 71 | 30 | 2 | 4 | 1 | 7 | 10 | 10 | 5 | 6 | 32 | 100 | CoO | 50 |
| | 72 | 30 | 2 | 4 | 1 | 7 | 10 | 10 | 5 | 6 | 32 | 100 | TiO$_2$ | 50 |
| | 81 | 35 | 4 | 4 | 2 | 10 | | | 51 | 4 | | 100 | CuO | 50 |
| | 82 | 58 | 7 | 7 | 2 | 16 | | | 15 | 11 | | 100 | CuO | 50 |
| | 83 | 45 | 15 | 15 | 6 | 36 | | | 15 | 4 | | 100 | CuO | 50 |
| | 84 | 79 | 4 | 4 | 2 | 10 | | | 10 | 1 | | 100 | CuO | 50 |
| | 85 | 66 | 7 | 7 | 2 | 16 | 3 | | 15 | | | 100 | CuO | 50 |
| | 86 | 66 | 7 | 7 | 2 | 7 | | | 12 | 6 | | 100 | CuO | 50 |
| | 87 | 30 | 7 | 7 | 2 | 16 | 10 | 10 | 10 | 6 | 18 | 100 | CuO | 50 |
| | 88 | 35 | 15 | 14 | 3 | 32 | 10 | 8 | 8 | 7 | | 100 | CuO | 50 |

| | | Crack Generation Rate | | | | | | Result of the Moisture Resistance Experiment | | | | | |
|---|---|---|---|---|---|---|---|---|---|---|---|---|---|
| | | Green Body Crack Generation Rate | | Crack Generation Rate | | Green-body-reaching Prevention Rate | | Before Sandblast Withstand Voltage (Ave)/V | After Sandblast Withstand Voltage (Ave)/V | Comparison Before And After Sandblast/% | | Strain Experiment | Plating Tolerance |
| | No. | Evaluation | Generation Rate/% | Evaluation | Generation Rate/% | Evaluation | Prevention Rate/% | | | | Evaluation | | |
| Example | 58 | ◎ | 0 | ◎ | 7 | ◎ | 100 | 84 | 81 | −4 | ◎ | ◎ | ○ |
| | 59 | ◎ | 1 | ◎ | 9 | ◎ | 89 | 87 | 85 | −2 | ◎ | ◎ | ○ |
| | 60 | ◎ | 0 | ◎ | 6 | ◎ | 100 | 88 | 87 | −1 | ◎ | ◎ | ○ |
| | 61 | ◎ | 0 | ◎ | 7 | ◎ | 100 | 86 | 85 | −1 | ◎ | ◎ | ○ |
| | 62 | ◎ | 1 | ◎ | 9 | ◎ | 89 | 87 | 84 | −3 | ◎ | ◎ | ○ |
| | 63 | ◎ | 0 | ○ | 12 | ◎ | 100 | 89 | 85 | −4 | ◎ | ○ | ○ |

TABLE 3-continued

| No. | Evalu-ation | Generation Rate/% | Evalu-ation | Generation Rate/% | Evalu-ation | Prevention Rate/% | Before Sandblast Withstand Voltage (Ave)/V | After Sandblast Withstand Voltage (Ave)/V | Comparison Before and After Sandblast/% | Evalu-ation | Strain Experiment | Plating Tolerance |
|---|---|---|---|---|---|---|---|---|---|---|---|---|
| 64 | ◎ | 1 | ○ | 10 | ◎ | 90 | 86 | 83 | −3 | ◎ | ○ | ○ |
| 65 | ◎ | 0 | ○ | 12 | ◎ | 100 | 86 | 86 | 0 | ◎ | ○ | ○ |
| 66 | ◎ | 0 | ○ | 13 | ◎ | 100 | 87 | 86 | −1 | ◎ | ○ | ○ |
| 67 | ◎ | 1 | ○ | 11 | ◎ | 91 | 89 | 84 | −6 | ◎ | ○ | ○ |
| 68 | ◎ | 0 | ◎ | 8 | ◎ | 100 | 86 | 83 | −3 | ◎ | ○ | △ |
| 69 | ◎ | 0 | ◎ | 5 | ◎ | 100 | 90 | 86 | −4 | ◎ | ○ | △ |
| 70 | ◎ | 0 | ◎ | 4 | ◎ | 100 | 87 | 84 | −3 | ◎ | ○ | △ |
| 71 | ◎ | 0 | ◎ | 6 | ◎ | 100 | 89 | 85 | −4 | ◎ | ○ | △ |
| 72 | ◎ | 1 | ◎ | 9 | ◎ | 89 | 86 | 84 | −2 | ◎ | ○ | △ |
| 81 | ◎ | 0 | ◎ | 5 | ◎ | 100 | 88 | 84 | −5 | ◎ | ◎ | ○ |
| 82 | ◎ | 0 | ◎ | 4 | ◎ | 100 | 89 | 85 | −4 | ◎ | ◎ | ○ |
| 83 | ◎ | 1 | ◎ | 8 | ◎ | 88 | 75 | 71 | −5 | ◎ | ◎ | ○ |
| 84 | ◎ | 0 | ○ | 15 | ◎ | 100 | 85 | 81 | −5 | ◎ | ◎ | ◎ |
| 85 | ◎ | 1 | ◎ | 5 | ◎ | 80 | 83 | 80 | −4 | ◎ | ◎ | ○ |
| 86 | ◎ | 0 | ◎ | 4 | ◎ | 100 | 89 | 84 | −6 | ◎ | ○ | ◎ |
| 87 | ◎ | 1 | ◎ | 8 | ◎ | 88 | 88 | 85 | −3 | ◎ | ◎ | ○ |
| 88 | ◎ | 1 | ◎ | 7 | ◎ | 86 | 83 | 80 | −4 | ◎ | ◎ | ○ |

Samples No. 58-88 in Table 3 used the oxides of elements chosen from Al, Zr, Ti, Ce, Mn, Cu and Co as the ceramic filler and changed the glass composition.

Samples No. 1-53, which include 35-75 wt % of $SiO_2$, 10-35 wt % of alkali metal, 10-50 wt % of BaO, and 1-10 wt % of $Al_2O_3$ as the glass composition, are excellent in the crack generation rate, and the result of the strain experiment and/or plating tolerance, comparing with samples No. 58-88 in which $SiO_2$, alkali metal, BaO and/or $Al_2O_3$ with a content outside the above-mentioned range were contained as the glass composition.

samples in Table 1-Table 3, two kinds of ceramic filler, i.e. CuO and NiO were mixed as the ceramic filler with a content recorded in Table 4.

According to Table 1-Table 4, even when two kinds of ceramic filler were used, the tendency was the same as the cases when only one kind of ceramic filler was used.

DESCRIPTION OF THE SYMBOLS

2, 102 Multilayer ceramic capacitor
3 Element body

TABLE 4

| | | Glass Composition (wt %) | | | | | | Ceramic Filler Composition | | | | Total |
|---|---|---|---|---|---|---|---|---|---|---|---|---|
| | | | | | Alkali Metal Compo-sition | | | | Kind of Filler Compo-sition ① | Content in the Whole Insulating Layer/ wt % | Kind of Filler Compo-sition ② | Content in the Whole Insulating Layer/ wt % | Content in the Whole Insulating Layer/ wt % |
| | No. | $SiO_2$ | $Na_2O$ | $K_2O$ | $Li_2O$ | | BaO | $Al_2O_3$ | Total | | | | |
| Ex-am-ple | 91 | 44 | 13 | 12 | 3 | 28 | 23 | 5 | 100 | CuO | 60 | NiO | 2 | 62 |
| | 92 | 44 | 13 | 12 | 3 | 28 | 23 | 5 | 100 | CuO | 45 | NiO | 5 | 50 |
| | 93 | 44 | 13 | 12 | 3 | 28 | 23 | 5 | 100 | CuO | 30 | NiO | 8 | 38 |
| | 94 | 44 | 13 | 12 | 3 | 28 | 23 | 5 | 100 | CuO | 20 | NiO | 10 | 30 |
| | 95 | 44 | 13 | 12 | 3 | 28 | 23 | 5 | 100 | CuO | 10 | NiO | 15 | 25 |
| | 96 | 44 | 13 | 12 | 3 | 28 | 23 | 5 | 100 | CuO | 5 | NiO | 6 | 11 |
| | 97 | 44 | 13 | 12 | 3 | 28 | 23 | 5 | 100 | CuO | 5 | NiO | 1 | 6 |

| | | Crack Generation Rate | | | | | | Result of the Moisture Resistance Experiment | | | | | |
|---|---|---|---|---|---|---|---|---|---|---|---|---|---|
| | | Green Body Crack Generation Rate | | Crack Generation Rate | | Green-body-reaching Prevention Rate | | Before Sandblast Withstand Voltage (Ave)/V | After Sandblast Withstand Voltage (Ave)/V | Comparison Before and After Sandblast/ % | | Strain Experiment | Plating Tolerance |
| | No. | Evalu-ation | Generation Rate/% | Evalu-ation | Generation Rate/% | Evalu-ation | Prevention Rate/% | | | | Evalu-ation | | |
| Ex-am-ple | 91 | ◎ | 0 | ◎ | 9 | ◎ | 100 | 86 | 76 | −12 | ○ | ○ | ◎ |
| | 92 | ◎ | 0 | ◎ | 7 | ◎ | 100 | 89 | 85 | −4 | ◎ | ◎ | ◎ |
| | 93 | ◎ | 0 | ◎ | 8 | ◎ | 100 | 83 | 80 | −4 | ◎ | ◎ | ◎ |
| | 94 | ◎ | 3 | ○ | 14 | ○ | 79 | 86 | 75 | −13 | ○ | ○ | ◎ |
| | 95 | ◎ | 3 | ○ | 17 | ○ | 82 | 84 | 80 | −5 | ◎ | ◎ | ◎ |
| | 96 | ○ | 8 | ○ | 19 | ○ | 58 | 86 | 82 | −5 | ◎ | ◎ | ◎ |
| | 97 | ○ | 10 | ○ | 22 | ○ | 55 | 84 | 83 | −1 | ◎ | ◎ | ◎ |

Samples No. 91-97 in Table 4 used the same glass composition in the insulating layers 16 and changed the kind and content of the ceramic composition. Different from

4 Ceramic sintered body
6 First external electrode
8 Second external electrode 10 Inside dielectric layer
11 Exterior region
12 Internal electrode layer
12A, 12B Lead-out section
13 Interior region
14 Capacity region
15A, 15B Lead-out region
16 Insulating layer
16a Covering section
104 Substrate
106 Pressing tool
114 Pad section
118A, 118B Experiment terminal
120 Pressing part

The invention claimed is:

1. A multilayer electronic component comprising an element body where a plurality of internal electrode layers and dielectric layers are alternately laminated, wherein
the dielectric layers are comprised of dielectric material having a perovskite structure as a main composition,
an insulating layer is disposed on at least one side surface of the element body, wherein the at least one side surface is a surface parallel to a lamination direction of the plurality of internal electrode layers and dielectric layers, and a width from an end surface of an element body of the component to an external surface of the insulating layer in a direction perpendicular to the lamination direction is from 0.5 to 30 μm, and
the insulating layer comprises a glass composition and a ceramic composition wherein when the whole insulating layer is 100 wt %, a content of the ceramic composition is 10-70 wt %.

2. The multilayer electronic component according to claim 1, wherein the ceramic composition comprises oxides containing at least one element from a group of Al, Zr, Ti, Ce, Fe, Mn, Cu, Co and Zn.

3. The multilayer electronic component according to claim 2, wherein when the whole glass composition is 100 wt %, the glass composition comprises 35-75 wt % of $SiO_2$.

4. The multilayer electronic component according to claim 3, wherein when the whole glass composition is 100 wt %, the glass composition comprises 10-35 wt % of an alkali metal.

5. The multilayer electronic component according to claim 2, wherein when the whole glass composition is 100 wt %, the glass composition comprises 10-35 wt % of an alkali metal.

6. The multilayer electronic component according to claim 1, wherein when the whole glass composition is 100 wt %, the glass composition comprises 35-75 wt % of $SiO_2$.

7. The multilayer electronic component according to claim 6, wherein when the whole glass composition is 100 wt %, the glass composition comprises 10-35 wt % of an alkali metal.

8. The multilayer electronic component according to claim 1, wherein when the whole glass composition is 100 wt %, the glass composition comprises 10-35 wt % of an alkali metal.

9. The multilayer electronic component according to claim 1, wherein when the whole glass composition is 100 wt %, the glass composition comprises 10-50 wt % of BaO.

10. The multilayer electronic component according to claim 1, wherein when the whole glass composition is 100 wt %, the glass composition comprises 1-10 wt % of $Al_2O_3$.

11. The multilayer electronic component according to claim 1, wherein the dielectric material having a perovskite structure is represented by chemical formula $ABO_3$, wherein A is at least one element chosen from a group consisting of Ca, Ba and Sr, and B is at least one element chosen from a group consisting of Ti and Zr.

12. The multilayer electronic component according to claim 1, wherein when the whole insulating layer is 100 wt %, a content of the ceramic composition is 11-62 wt %.

13. The multilayer electronic component according to claim 1, wherein when the whole insulating layer is 100 wt %, a content of the ceramic composition is 30-60 wt %.

14. The multilayer electronic component according to claim 1, wherein when the whole insulating layer is 100 wt %, a content of the ceramic composition is 40-56 wt %.

* * * * *